United States Patent Office 3,113,879

Patented Dec. 10, 1963

3,113,879

ALUMINUM NITRIDE REFRACTORY AND METHOD OF MAKING

Luther M. Foster and George Long, New Kensington, Pa., assignors to Aluminum Company of America, Pittsburgh, Pa., a corporation of Pennsylvania No Drawing. Filed Aug. 8, 1961, Ser. No. 129,975
7 Claims. (Cl. 106—65)

This invention relates to refractory products and a process for making the same, and relates particularly to aluminum nitride refractory articles and a process for making aluminum nitride refractory articles.

There is a continuing search for a satisfactory container material for liquid aluminum at high temperatures. A number of materials have adequate resistance to attack by aluminum at lower temperatures and have satisfactory mechanical properties and ease of fabrication. Such materials include graphite, carbon, alumina (Alundum), plumbago, and various materials of relatively inert granular matter bonded with a small amount of silica or silicate. Resistance of these materials has been improved by applying wash coatings of various types. None of the above-mentioned materials, however, resist attack by aluminum at very high temperatures. Moreover, at high temperatures, solubility of the refractory becomes a problem. Recently nitrides of boron, titanium and zirconium have been used in making refractory articles. These have not been satisfactory for containing aluminum melts in temperatures above 1800° C. Another suggested material has been beryllium oxide. However, it was found to be unsatisfactory above 1200° C. A substance to be completely inert to aluminum must not contain any foreign metal ion since the aluminum will always react with such a compound. The refractory material therefore must be a compound of aluminum. Aluminum nitride has been found as the only aluminum compound that has no chemical reaction with aluminum and has satisfactory properties as a ceramic material.

Aluminum nitride is also of interest as a container material for the purification and alloying of high-purity gallium in the synthesis of compound semiconductors. Aluminum nitride is of further interest as a boron oxide-resistant material for use in high energy boron-fuel power plants.

Aluminum nitride refractory articles are made by compacting aluminum nitride particles together into desired shapes, such as by hydrostatically pressing rubber molds filled with aluminum nitride particles. When hollow articles such as crucibles, are desired the inside contour can be obtained by the use of a mandrel. After pressing, the molded bodies are sintered at temperatures of from about 1950° C. to 2050° C. in an atmosphere inert to aluminum nitride, such as argon gas. Heretofore this method produced sintered articles having densities of less than 2.66 grams per cc. although the density of crystalline aluminum nitride is 3.26 grams per cc. A higher density in the sintered articles is desirable because the less porous the article material the less adhesion between the article and the melt which it may contain. Moreover, a higher density refractory has less minute indentations for retaining entrapped gases which react with the melt and introduce impurities.

It is an object of this invention to provide an aluminum nitride article of unusually high density, and a method for making the same, and it is a particular object of this invention to provide a high density article having a particular combination of refractory properties heretofor unavailable in refractory compositions and a method of making such a refractory.

In accordance with this invention, a molded body of aluminum nitride particles is sintered at a temperature above 1950° C. in an atmosphere containing carbon monoxide. The carbon monoxide may be diluted with a gas which is inert to the other materials present. Argon, helium and nitrogen are examples of suitable inert gases. For best results, the atmosphere should contain at least 10% carbon monoxide by volume.

The introduction of carbon monoxide during the sintering step results in formation of aluminum oxycarbide in the sintered article, with a resultant increase in density in the sintered product. It is believed that the aluminum oxycarbide is produced from the reaction of carbon monoxide with aluminum formed by dissociation of some of the aluminum nitride due to the high temperature.

The sintering step in the carbon monoxide-containing atmosphere is continued until the sintered article has a density of at least 3 grams per cc. The sintered articles having such a density contain at least 4.5% aluminum oxycarbide by weight. Ordinarily sintering for a period of 1 to 2 hours in an atmosphere containing at least 10% carbon monoxide will be sufficient to produce an article having a density of at least 3 grams per cc. In general, the higher the temperature employed, the shorter the period required to achieve the required density.

The improvement in density of the aluminum nitride refractory article resulting from the inclusion of a controlled amount of carbon monoxide in the furnace atmosphere is illustrated in the examples set forth below in which the aluminum nitride was made by vaporizing high-purity aluminum electrodes in a nitrogen atmosphere.

*Example I*

Hydrostatically pressed articles were formed in the manner described above and machined to the desired wall thickness and smoothness. The hydrostatically pressed articles were then placed in a graphite crucible within a sealed induction heated furnace having a graphite susceptor, carbon black insulation, a fused-quartz outer wall and using a 30 kw. 10,800-cycle Tocco generator unit. The articles were sintered for approximately 1 to 2 hours in an atmosphere of argon gas at a temperature above 1950° C. The sintered articles were found to have a density no greater than 2.66 grams per cc. When compared, in terms of percent, with aluminum nitride crystals which have a density of 3.26 grams per cc., the above-sintered articles were 81.5% as dense as aluminum nitride crystals.

*Example II*

A hydrostatically pressed article was formed and machined in the same manner as described in Example I above. The article was heated in an induction heated furnace as described in Example I. Argon and carbon monoxide gas were withdrawn from separate cylinders, mixed by means of a T-joint and continuously introduced into the furnace atmosphere while the mixed gas was being withdrawn from the furnace through an outlet, thereby maintaining a flowing atmosphere within the furnace. The gas mixture contained 10% carbon monoxide by volume; the remainder was argon gas. The aluminum nitride article was sintered by heating in this atmosphere for 1 to 2 hours at a temperature above 1950° C. The sintered article in this example was found to have a density of 3.14 grams per cc. In terms of percent it was 96.3% as dense as aluminum nitride crystals. With the controlled addition of carbon monoxide into the furnace atmosphere the sintered aluminum nitride article was about 15% more dense than the articles sintered under the same conditions but with a furnace atmosphere containing argon gas alone. Flowing the carbon monoxide plus argon gas through the furnace atmosphere assured a fresh supply of carbon monoxide in the atmosphere surrounding the aluminum nitride article to enable complete chemical reaction to form aluminum oxycarbide.

We claim:

1. The process for making a high density aluminum nitride article which comprises forming an article of desired shape from aluminum nitride particles, and heating said aluminum nitride article above 1950° C. in a gaseous atmosphere selected from the group consisting of carbon monoxide and a mixture of at least 10% carbon monoxide and an inert gas for a period of time sufficient to produce an article having a density of at least 3.00 grams per cc.

2. The process of making a high density aluminum nitride refractory article which comprises forming an article of desired shape from aluminum nitride particles and heating said aluminum nitride article above 1950° C. in a gaseous atmosphere selected from the group consisting of carbon monoxide and a mixture of carbon monoxide and an inert gas, for a period of time sufficient to produce an article having a density of at least 3.00 grams per cc.

3. The process for making a high density aluminum nitride refractory article which comprises forming an article of desired shape from aluminum nitride, particles, and heating said nitride article above 1950° C. in a gaseous atmopshere selected from the group consisting of carbon monoxide and a mixture of carbon monoxide and argon gas, for a period of time sufficient to produce an article having a density of at least 3.00 grams per cc.

4. The process for making a high density aluminum nitride refractory article which comprises forming an article of desired shape from aluminum nitride particles, and heating said aluminum nitride article in a gaseous atmosphere selected from the group consisting of carbon monoxide and a mixture of at least 10% carbon monoxide and argon gas, at a temperature above 1950° C. for 1 to 2 hours, the resultant article being characterized by having a density of at least 3.00 grams per cc.

5. A high density aluminum nitride article consisting essentially of sintered aluminum nitride particles and aluminum oxycarbide, said article having a density of at least 3.00 grams per cc.

6. The process for making a high density aluminum nitride article which comprises forming an article of desired shape from aluminum nitride particles, and heating said aluminum nitride article above 1950° C. in a gaseous atmosphere selected from the group consisting of carbon monoxide and a mixture of at least 10% carbon monoxide and argon gas for a period of time sufficient to produce an article having a density of at least 3.00 grams per cc.

7. The process for making a high density aluminum nitride article which comprises forming an article of desired shape from aluminum nitride particles, and heating said aluminum nitride article in a gaseous atmosphere selected from the group consisting of carbon monoxide and a mixture of at least 10% carbon monoxide and an inert gas, at a temperature above 1950° C. for 1 to 2 hours, the resultant article being characterized by having a density of at least 3.00 grams per cc.

References Cited in the file of this patent

UNITED STATES PATENTS 2,922,213 Bollack et al. ____________ Jan. 26, 1960
2,929,126 Bollack et al. ____________ Mar. 22, 1960

FOREIGN PATENTS 1,961 Great Britain ____________________ 1912